Sept. 22, 1953    B. LEE    2,652,674
HARROW DRAWBAR
Filed Nov. 13, 1950

Bernt Lee
INVENTOR.

Patented Sept. 22, 1953

2,652,674

UNITED STATES PATENT OFFICE 2,652,674

HARROW DRAWBAR

Bernt Lee, Viborg, S. Dak.

Application November 13, 1950, Serial No. 195,298

1 Claim. (Cl. 55—84)

This invention comprises novel and useful improvements in a harrow drawbar, and more specifically pertains to a drawbar construction of a knockdown type in which the various sections of the same may be readily connected or disconnected to provide a drawbar of sufficient length and strength, or to fold or collapse the same for compact storage and transportation.

The primary object of this invention is to provide a drawbar specifically adapted for handling agricultural harrows, and which shall be of an improved knockdown construction.

A further object of the invention is to provide a harrow drawbar assembly in accordance with the foregoing object which shall permit a limited swivelling movement of the sections with respect to each other, to enable the drawbar to accommodate itself to irregularities in the ground or terrain over which the implements connected to the drawbar are being moved.

A further object of the invention is to provide an improved harrow drawbar of an improved sectional construction as set forth in the foregoing objects in which adequate means is provided for bracing and rigidifying the assembly for use.

These, together with various ancillary features and objects of the invention which will later become apparent as the following description proceeds, are attained by the present invention, a preferred embodiment of which has been illustrated, by way of example only, in the accompanying drawings, wherein.

Figure 1:
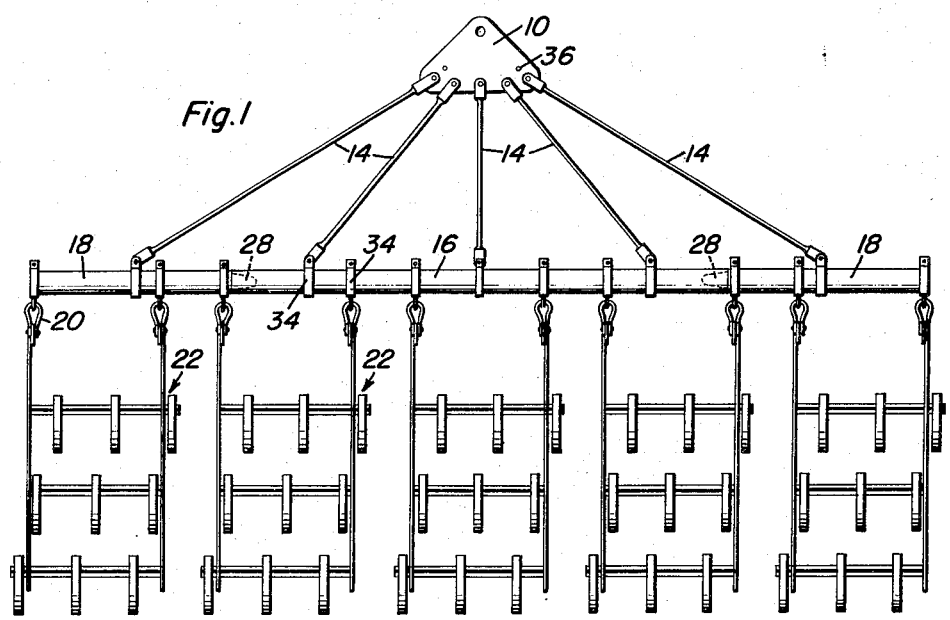
Figure 1 is a top plan view showing a suitable embodiment of harrow drawbar assembly constructed in accordance with this invention and having a plurality of harrows attached thereto.
Figure 2:
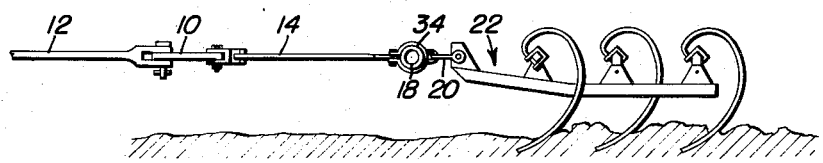
Figure 2 is a side elevational view of the harrow drawbar of Figure 1.
Figure 3:
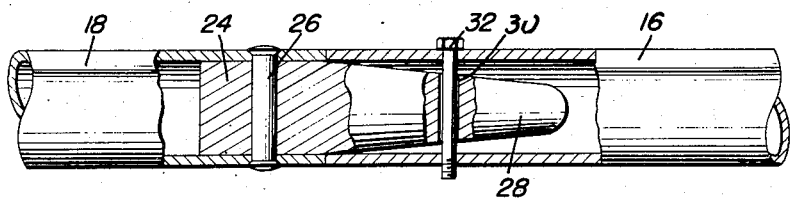
Figure 3 is a fragmentary vertical sectional view showing the manner in which the cross beam and cross beam extensions are connected in accordance with this invention.

Referring now more specifically to the accompanying drawings, wherein like numerals designate similar parts throughout the various views, attention is directed first to Figure 1, wherein it will be seen that the entire assembly consists of a draft plate 10 adapted to be connected to any suitable draft implement, as by the tongue 12, see Figure 2, the draft plate itself being connected by a plurality of connecting links 14 whose other ends are connected to a cross-beam assembly consisting of a tubular cross-beam member 16 having cross-beam extensions 18 secured to the ends thereof. The cross-beam assembly has connected thereto, as by swivels or the like 20, a plurality of agricultural harrows, each indicated generally by the numeral 22.

Where it is desired to simultaneously utilize a plurality of harrows 22, from a single towing vehicle, it will be evident that some provision must be made to enable the connecting linkage to accommodate itself to irregularities of terrain so that each of the harrows may position itself in conformity with the surface of the ground.

For that purpose, the cross-beam assembly of the present invention is of self-adjusting and knockdown construction as follows:

The cross beam assembly includes a central or main member consisting of a tubular cross-beam 16 to the opposite ends of which are swivelly connected the cross-beam extensions 18. These latter may likewise consist of tubular members of substantially the same diameter as that of the cross-beam 16. Alternately, of course, the members 16 and 18 could be of solid construction provided that the ends of the member 16 are provided with sockets or recesses to accommodate a connection by which the extensions are to be attached thereto.

However, as shown, the extensions 18 are likewise of tubular construction and have rigidly secured in their ends which are adjacent the cross-beam 16 connecting terminals in the form of cylindrical members 24 which are received in the ends of the extensions 18 and are rigidly secured thereto in any desired manner, as by rivets or the like 26, these terminal members having conical end portions 28 which are adapted to be received in the open ends of the cross-beam member 16. In order to retain the extensions in connection with the central member 16, the conical terminal portions 28 are provided with diametrical slots 30 and fastening bolts 32 or similar fastening members are disposed through the members 16 and 28, the bolts extending through the bores or slots 30. The arrangement is such that a limited swivelling movement is permitted between the bolt 32 and the slot 30, so that the extensions 18 may have a slight oscillating or swivelling movement with respect to the central cross-beam 16, so that the cross-beam assembly throughout its length is enabled to accommodate itself to various irregularities in the surface of the terrain over which the device is travelling.

A plurality of clamping rings 34 are welded, bolted, or otherwise suitably secured to the cross-beam member 16 and the extensions 18, these clamping rings serving to detachably connect the swivel members 20 by which the harrows 22 are attached to the cross-beam assembly, and also serving as a means for attaching the connecting members 14 on the draft plate 10. Preferably, the central tubular member 16 is provided with a plurality of connecting members 14, three being shown in Figure 1, whereby the member 16 is retained in fixed relation to the draft plate 10. However, it is preferred to provide a single connecting means 14 for each of the extensions 18 and to make provision for adjusting or varying the effective length of this connection. Thus, the draft plate 10 adjacent its rearward edge is provided with a plurality of apertures for pivotally connecting the forward ends of each of the connecting means 14. However, at its ends, the back edge of the draft plate is provided with a pair of apertures, whereby the two endmost connecting means 14 may be adjustably connected to the apertures 36. Thus, the extensions 18 can be connected to the draft plate 10 at a slight inclination with respect to the center line of the tubular member 16 rather than in direct line therewith. This permits a slight adjustment of the agricultural harrows carried by the attachment.

From the foregoing, it is thought that the construction and operation of the invention, together with its many advantages, will be readily apparent and further explanation is believed to be unnecessary. However, since numerous modifications and changes will readily occur to those skilled in the art after a consideration of the foregoing specification and accompanying drawings, it is not desired to limit the invention to the exact construction shown and described, but all suitable modifications and equivalents may be resorted to, falling within the scope of the appended claim.

Having thus disclosed and described the invention, what is claimed as new is as follows:

A harrow drawbar comprising a tubular cross-beam, a cross-beam extension having a conical terminal oscillatably and detachably received in an end of said cross-beam, a draft plate, means connecting said cross-beam and extension to said draft plate, said draft plate including a horizontally disposed triangular plate having an apertured apex for attachment to a draft implement and a base disposed parallel to said cross-beam, a series of laterally displaced, vertical apertures in said draft plate for receiving said connecting means, said connecting means comprising a plurality of links connecting said draft plate to said cross-beam, and a single link connecting each extension to said draft plate, said draft plate having a plurality of longitudinally spaced apertures for each extension link to adjust the horizontal angularity of the extensions relative to said cross-beam.

BERNT LEE.

References Cited in the file of this patent

UNITED STATES PATENTS

| Number | Name | Date |
| --- | --- | --- |
| 927,713 | Clausen | July 13, 1909 |
| 1,653,292 | Kelly | Dec. 20, 1927 |
| 1,918,213 | Pozandak | July 11, 1933 |
| 2,131,667 | Noble | Sept. 27, 1938 |